(12) United States Patent
Scardina et al.

(10) Patent No.: US 7,587,667 B2
(45) Date of Patent: Sep. 8, 2009

(54) TECHNIQUES FOR STREAMING VALIDATION-BASED XML PROCESSING DIRECTIONS

(75) Inventors: Mark Vincent Scardina, San Francisco, CA (US); Jinyu Wang, Fremont, CA (US); K Karun, Mountain View, CA (US); Kongyi Zhou, Fremont, CA (US); Benjamin Chang, Atherton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 525 days.

(21) Appl. No.: 10/798,474

(22) Filed: Mar. 10, 2004

(65) Prior Publication Data

US 2005/0055631 A1 Mar. 10, 2005

Related U.S. Application Data

(60) Provisional application No. 60/500,569, filed on Sep. 4, 2003.

(51) Int. Cl.
G06F 17/00 (2006.01)
(52) U.S. Cl. .................. 715/230; 715/234; 715/255
(58) Field of Classification Search ............ 235/462.01; 707/10, 3; 715/513, 234–239
See application file for complete search history.

(56) References Cited

U.S. PATENT DOCUMENTS

| 6,643,650 | B1 * | 11/2003 | Slaughter et al. .............. 707/10 |
| 6,655,593 | B2 * | 12/2003 | Alleshouse ............ 235/462.01 |
| 7,134,072 | B1 * | 11/2006 | Lovett et al. ................. 715/513 |
| 2002/0184145 | A1 * | 12/2002 | Sijacic et al. ................. 705/40 |
| 2003/0018666 | A1 * | 1/2003 | Chen et al. .................. 707/513 |
| 2003/0159112 | A1 * | 8/2003 | Fry ............................. 715/513 |
| 2003/0163603 | A1 * | 8/2003 | Fry et al. ..................... 709/328 |
| 2004/0073870 | A1 * | 4/2004 | Fuh et al. .................... 715/513 |
| 2004/0225647 | A1 * | 11/2004 | Connelly et al. ............... 707/3 |
| 2005/0039124 | A1 * | 2/2005 | Chu et al. ................... 715/531 |

OTHER PUBLICATIONS

Oracle Corporation, "What is Reduced XML?," Publicly presented as early as Jul. 8, 2003, 4 pages.
Jinyu Wang and Mark Scardina, "XML Data Streaming for Enterprise Applications Using PL/SQL and SAX," Apr. 3, 2002, 11 pages.
Deepak Vohra, "Validating XML Documents Against XML Schema," Feb. 4, 2004, http://otn.oracle.com/pub/articles/vohra_xmlschema.html?_template+/otn/content/print, retrieved Jun. 18, 2004, pp. 1-4.

(Continued)

*Primary Examiner*—Doug Hutton
*Assistant Examiner*—Quoc A Tran
(74) *Attorney, Agent, or Firm*—Hickman Palermo Truong & Becker LLP

(57) ABSTRACT

An XML processing model enables applications that use an XML stream to perform metadata-based or other processing of data during a data validation operation while preserving a streaming processing model. For example, while an XML node is being validated, requests can be received regarding the status of the validation and any processing that may be required with the node in order to conform it to requirements of an external application. A validator exposes public APIs that allow such validation-time requests from an event handler that is associated with an external application and that is registered with the XML stream. Messages that identify schema annotation definitions are provided to an external application to direct the type of processing to be performed on nodes at application runtime. Thus, applications can process a node according to the annotation definition concurrently with validation of the given node by the validator.

45 Claims, 4 Drawing Sheets

OTHER PUBLICATIONS

W3C, "XQuery 1.0 and XPath 2.0 Data Model," Nov. 12, 2003, http://www.w3.org/TR/2003/WD-xpath-datamodel-20031112/, retrieved Jun. 22, 2004, pp. 1-72.

W3C, "XML Schema Part 1: Structures," May 2, 2001, http://www.w3.org/TR/2001/REC-xmlschema-1-20010502/, retrieved Jun. 22, 2004, pp. 1-186.

* cited by examiner

TECHNIQUES FOR STREAMING VALIDATION-BASED XML PROCESSING DIRECTIONS

CROSS REFERENCE TO RELATED APPLICATION

This application claims the benefit of priority to U.S. Provisional Patent Application No. 60/500,569 filed on Sep. 4, 2003, entitled "Techniques for Streaming Validation-Based XML Processing," which is incorporated by reference in its entirety for all purposes as if fully set forth herein.

FIELD OF THE INVENTION

The present invention relates generally to XML processing and, more specifically, to techniques for streaming validation-based XML processing directions or definitions.

BACKGROUND OF THE INVENTION

XML (Extensible Markup Language) is rapidly becoming a widely-used enterprise application technology. The value of binding meta-data to instance data in an extensible character-based format has been recognized as the way to interoperate across platforms, operating systems, and the Internet. The introduction of XML Schema to the family of XML standards promised to bring data type support, thereby making XML even more valuable for business data and application integration. However, XML is an abstraction, so the price for its interoperability has been in increased processing time and resources. This becomes especially acute in an enterprise-level transaction-based application that depends on validating the input XML as well as performing transformations and additional workflow.

To date, standards-based approaches to validating and performing additional work with XML data have required multiple processing steps in which metadata is materialized for each step. Materializing metadata typically entails parsing the metadata and forming it into a structure or object through which you have access to the metadata in relation to the associated data, for further processing, such as for validation and transformation of the data. In most cases, such approaches eliminate the use of streaming or, if streaming is supported, limit the functionality of the streaming process. "Streaming" refers to techniques for transferring data such that the data can be processed as a steady and continuous stream.

For example, when an XML purchase order is validated against its associated schema, the validation operation requires materialization of metadata. Further, when the XML data needs to be processed to match a receiving application or database schema, for example, by applying XSLT (Extensible Stylesheet Language Transformation) stylesheets, an XSLT processor requires a resource-intensive DOM (Document Object Model) be built, which requires a second materialization of the metadata. In addition to the additional resource costs associated with such a two-step process, the stream-based functionality is eliminated.

Based on the foregoing, there is a general need for a technique for streaming validation-based XML processing directions.

BRIEF DESCRIPTION OF THE DRAWING

The present invention is depicted by way of example, and not by way of limitation, in the figures of the accompanying drawings and in which like reference numerals refer to similar elements and in which.

DETAILED DESCRIPTION OF EMBODIMENTS OF THE INVENTION

Functional Overview Of Embodiments

An XML processing model is described, which enables applications that are to use an XML stream to perform meta-data-based or other processing of the XML data during the validation operation, while preserving a streaming processing model. For example, while an element is being validated, queries can be issued regarding (1) the status of the validation, and (2) any processing that may be required with the element in order to conform the element to requirements of an external application. Hence, completely validating the entire XML document or message is not required prior to processing elements and attributes (hereinafter, "nodes") within the document. Furthermore, only a single parse of the input stream is necessary. Techniques that utilize this model provide faster and more efficient processing of XML streams than prior approaches.

Techniques described herein are generally enabled through use of a validator module that includes a state machine that is able to respond to requests about a validation operation on a parsed XML input stream, while validating the input stream. The validator exposes public APIs that allow such validation-time requests. Typically, such requests come from an event handler (generally, a function or method containing program statements that are executed in response to an event) that is associated with an external application and that is "registered" with the stream. In response to receiving an event (generally, an action or occurrence detected by a program), or information based on an event, at the event handler, the external application can request information from the validator via the APIs. Non-limiting examples of requested information may include information about the state of the validation operation, node data types, schema annotation definitions, etc.

Schema annotation definitions direct the type of processing to be performed on nodes at application runtime. Thus, applications can process a given streamed node according to an associated annotation definition virtually concurrently with validation of the given node by the validator. Furthermore, the validator (1) is not required to parse the input stream multiple times, for example, once for a validation operation and once for processing-related materialization of metadata; and (2) is not required to build a resource-intensive in-memory DOM.

Using the described techniques, application software (e.g., B2B and B2C e-business applications) can use existing XML documents and XML schemas for runtime operations. Thus, costly conversion of XML documents is avoided. Furthermore, processing XML documents to conform with application requirements as soon as possible during validation-time allows for transmission, manipulation and storage of such processed, or "reduced", documents, thereby resulting in faster and more efficient storage, retrieval and transmission of reduced documents, as compared with other approaches.

Operating Environment

Figure 1:
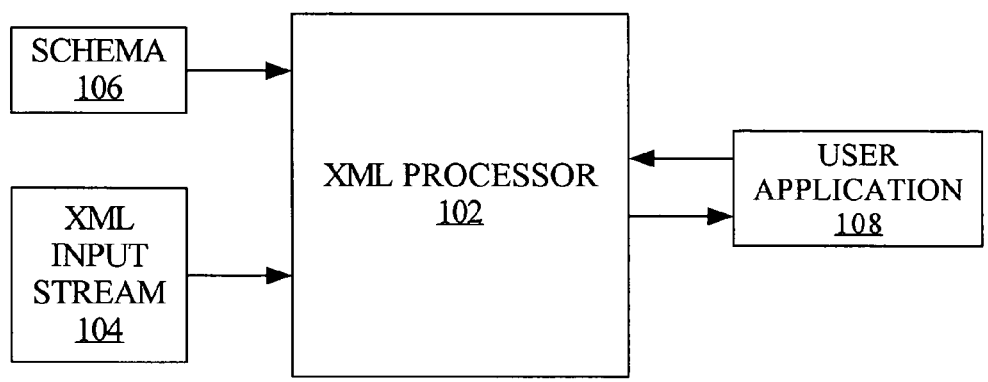
FIG. 1 is a block diagram that illustrates an operating environment in which an embodiment can be implemented.

FIG. 1 is a block diagram that illustrates an operating environment in which an embodiment can be implemented. Embodiments of the invention are implemented in an XML processor 102, which receives and acts upon XML input stream 104 based on a corresponding schema 106, and passes an output stream to a user application 108.

XML input stream 104 is typically one or more XML documents or messages or, generally, information encoded using XML which is streamed as input to the XML processor 102.

User application 108 comprises one or more sequences of instructions which, when executed by one or more physical processors, cause the physical processors to perform particular actions. In other words, user application 108 is any software application or module that consumes, uses or processes XML input stream 104 in order to perform some function.

Schema 106

XML processor 102 has access to a schema 106 that corresponds to the XML input stream 104. In general, a schema is an abstract representation of an object's characteristics and relationship to other objects. An XML schema describes the structure of and the interrelationship between nodes of an XML object, such as a document or a portion of a document. Schema 106 describes the nodes in the corresponding XML input stream 104 and can be used to verify that each item of content in a document adheres to the description of the node in which the content is located. This verification of the items is commonly referred to as "validating" the document.

In an embodiment, schema 106 comprises one or more annotation definitions associated with a node in XML input stream 104. Annotation definitions are described hereafter.

In an embodiment, schema 106 is in the form of an XSD (XML Schema Definition). However, the form of schema 106 may vary from implementation to implementation and, therefore, embodiments are not limited to use of XSDs. Generally, schema 106 contains information that dictates the structure of corresponding information, such as that contained in XML input 104 stream.

A non-limiting example of a schema 106 is an XSD that contains (1) information developed by a customer participating in an electronic business-to-business (B2B) or business-to-consumer (B2C) transaction and that is associated with and describes the structure of the content of a transactional document, such as a purchase order; and (2) information developed by a developer of an application, which annotates the customer XSD to direct processing to perform on the associated transactional document, e.g., the purchase order, to conform the content of the document to what the application needs to execute and function properly. For example, attribute annotations may specify how to map input attributes to corresponding columns in a database table in the application's database schema, so that the attribute content can be directly inserted into the table. For example, an attribute called "InvoiceTo" in the purchase order may map to a column called "BILLING_ADDR" in the application database schema.

In one embodiment, schema 106 is a "master" schema that comprises a plurality of schema definitions that are associated with a plurality of respective XML documents that may be part of the XML input stream 104. For example, one schema 106 may be a combination of each of the schemas that are associated with similar document types, such as respective purchase orders originating from each of multiple parties.

Schema Annotations

Broadly, metadata-based processing refers to any processing that is performed to conform data to requirements of the user application 108, and that is directed by one or more schemas or other forms of metadata associated with the data, such as schema 106 (FIG. 1). Actions performed during such processing of data are specified by a schema annotation definition or, simply, an "annotation." Each annotation describes, defines, specifies, references or, generally, directs processing to perform on an associated node of XML input stream 104 (FIG. 1).

A non-limiting example of metadata-based processing includes transformation of an XML node name to a column name that is associated with a data table so that the element contents can be directly inserted into the data table. Another non-limiting example of metadata-based processing includes conversion of the contents of an XML node, such as a currency conversion routine. Such a routine may be referenced in schema 106 in any form, such as a script, an XSLT template, a function call, and the like.

In an embodiment, the annotations in schema 106 direct how to process respective nodes of XML input stream 104 to conform with one or more requirements of a user application 108 that uses the respective nodes.

XML Processor 102

XML processor 102 comprises one or more sequences of instructions which, when executed by one or more physical processors, cause the physical processors to perform particular actions. XML processor 102 can execute on any suitable computer hardware platform, such as computer system 500 of FIG. 5. The components of XML processor 102 are described in reference to FIG. 2. Generally, XML processor 102 receives the XML input stream 104 in a streaming manner, and uses the schema 106 to validate the XML input stream 104 before streaming XML data contained in the XML input stream on to user application 108 as an output stream. In addition to validating and streaming the XML input stream 104, XML processor 102 responds to queries from user application 108, which is described hereafter.

Figure 2:
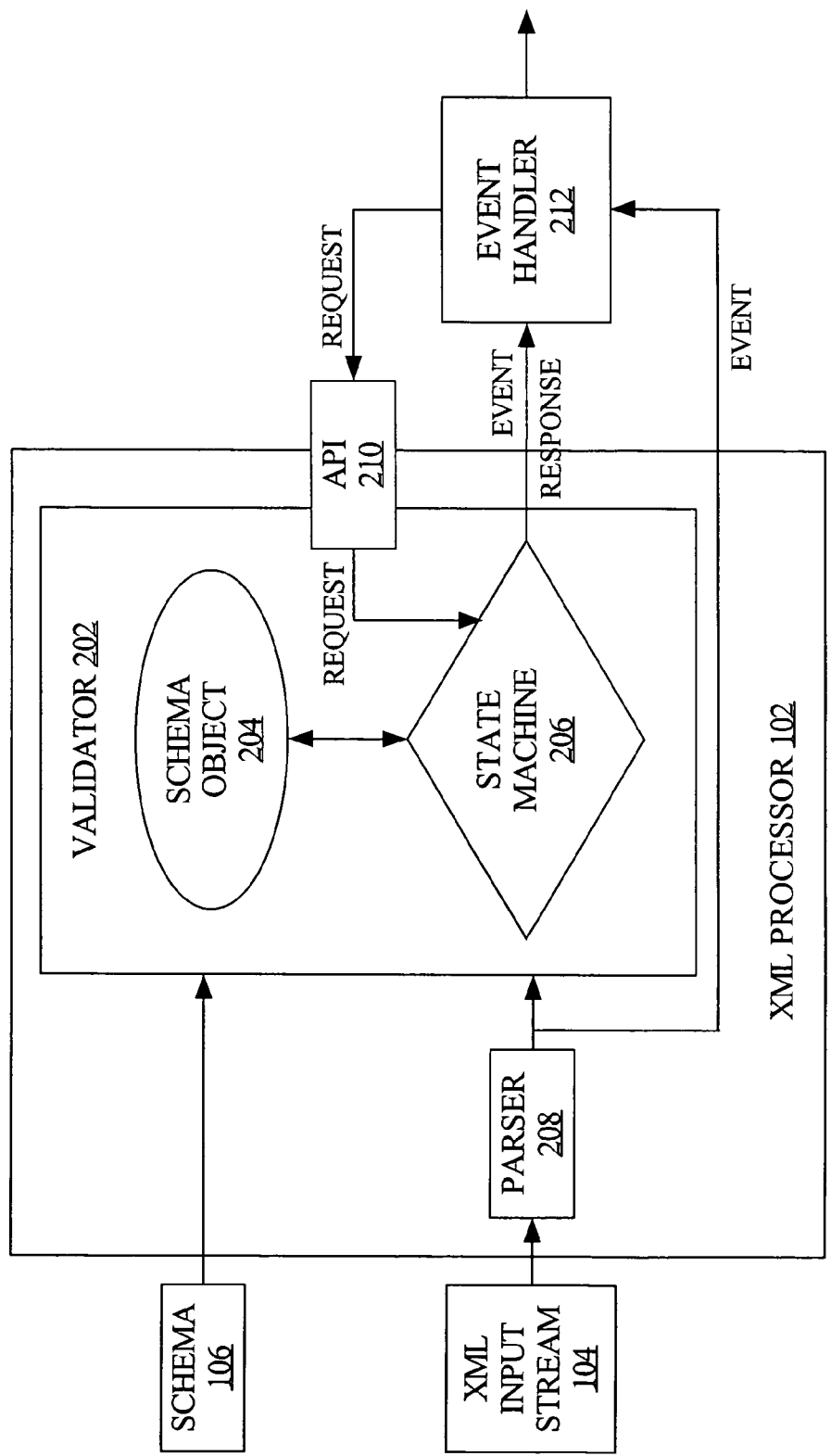
FIG. 2 is a block diagram that illustrates functional components of an XML processor and a user application, according to an embodiment.

FIG. 2 is a block diagram that illustrates functional components of XML processor 102 and user application 104, according to an embodiment. In one embodiment, XML processor 102 comprises a validator 202, a parser 208 and a set or routines whose interface is exposed as an API (application program interface) 210.

Validator 202

Validator 202 receives the XML input stream 104 via parser 208. Parser 208 parses the XML input stream 104 using conventional XML parsing techniques. In one embodiment, parser 208 is a SAX (Simple API for XML) parser that works in conjunction with a SAX, an event-driven API, to facilitate interpretation of an XML file. Validator 202 also receives or accesses schema 106 and instantiates schema objects 204 therefrom. A schema object 204 is instantiated for each node of schema 106, and governs the structure of the corresponding node. Typically, each node that is parsed from XML input stream 104 is validated against a corresponding schema object 204.

A validation operation performed by validator 202 may comprise (1) determining whether a given node from XML input stream 104 is described in schema 106; (2) determining the data type that is specified in schema 106 for the given node; and (3) determining whether the given node conforms to the corresponding specification in schema 106. The foregoing actions are performed, generally, by comparing a given node from XML input stream 104 with a corresponding schema object 204 that is instantiated based on schema 106.

State Machine 206

Validator 202 comprises a state machine 206, which receives the parsed XML input stream 104 from parser 208. State machine 206 maintains the state and progress of the validation operation performed by validator 202. For example, state machine 206 maintains a "record" of which node of XML input stream 104 is currently being processed by validator 202, at any given time, and what state the validation operation is currently at with respect to that node.

Furthermore, state machine 206 may pass events that are based on a SAX-based, parsed XML input stream 104. For example, state machine 206 may pass SAX-based events to an application event handler 212, which. Alternatively, events that are based on the SAX-based, parsed XML input stream 104 may be passed directly to the event handler 212 via a SAX-based output stream of parser 208, bypassing state machine 206. The XML processing model described herein is an event-based processing model. Hence, a client application, such as user application 108 (FIG. 1), can register an event handler 212 with the parser 208 output stream and, therefore, receive events associated with the XML input stream 104. For example, sending an event to event handler 212 may be triggered upon the identification or recognition of an attribute or element tag from parsed XML input stream 104.

Validator 202 exposes an API 210 to the event handler 212. Through API 210, event handler 212 can query the state machine 206. Event handler 212 can request information from state machine 206 in response to reception of an event. For example, upon receiving an event indicating the presence of a particular node in the XML input stream 104, event handler 212 can begin querying state machine 206 about the particular node, via API 210. Consequently, event handler 212 can be querying state machine 206 about a given node in "validation real-time", i.e., while the validator 202 is actually validating that node. End-to-end processing of a node of XML input stream 104 by XML processor 202, in conjunction with event handler 212, is described in further detail in reference to FIG. 3 and FIG. 4.

Streaming Validation-Based XML Processing Directions

A method for streaming "validation-based XML processing directions" generally refers to a method in which both (1) the validation of the content of a given node in an XML input stream and (2) further processing of the given node, such as metadata-based processing, can be performed essentially simultaneously. What is meant by "essentially simultaneously" and "substantially simultaneously" is that the method does not impart any significant or noticeable delay to, or does not significantly interrupt, the streaming of data through the XML processor 102 (FIG. 2) to an application that uses the data, such as user application 108 (FIG. 1).

Figure 3:
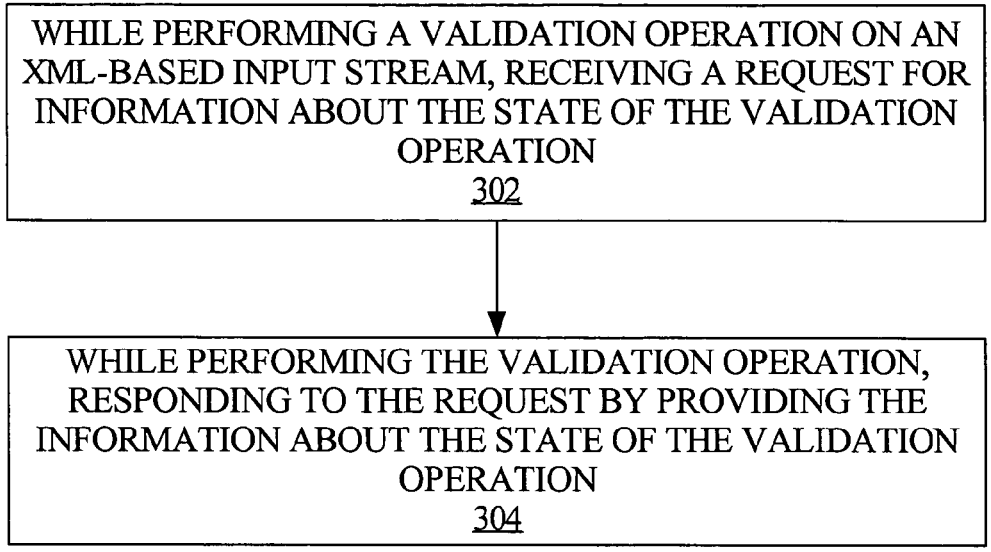
FIG. 3 is a flow diagram that illustrates a method for processing XML-based information.

FIG. 3 is a flow diagram that illustrates a method for processing XML-based information.

Blocks 302 and 304 are performed while performing a validation operation on an XML-based input stream, such as XML input stream 104 (FIG. 1). At block 302, a request for information about the state of the validation operation is received. At block 304, the request is responded to by providing the information about the state of the validation operation. In contrast to approaches in which the entire XML input is parsed and validated before any queries can be made about the validation operation, the technique illustrated in FIG. 3, which is enabled by the architecture depicted in FIG. 2, allows real-time (or "validation-time") querying regarding the validation operation that is currently being performed. Hence, the technique provides for requesting information about a particular node while that particular node is being validated, without necessarily having to wait for validation of any other nodes prior to requesting the information.

In an embodiment, the request at block 302 is received by state machine 206 of validator 202, from event handler 212 of user application 108, in response to reception at event handler 212 of an event in a SAX stream based on XML input stream 104. Furthermore, state machine 206 receives the same events as the event handler 212, which can be used by state machine 206 to track the validation operation performed on the XML input stream 104.

According to various embodiments, the types of requests that may be received at block 302 and responded to at block 304 include any one or more of the following.

(1) A request for whether the node currently being processed, i.e., validated, is defined in corresponding information that dictates the structure of XML data, such as schema 106.

(2) A request for the name of the node currently being processed.

(3) A request for the data type of the node currently being processed.

(4) A request for whether the node currently being processed conforms to information that dictates the structure of corresponding XML data, such as schema 106.

(5) A request for the current validation mode, such as strict, lax, or skip modes.

(6) A request for the current state of the validation operation.

(7) A request for any annotations that are associated with the node currently being processed.

In one embodiment, responding to the request includes providing the requested information in an output stream. Hence, the streaming nature of the data flow is maintained through validator 202 throughout the validation operation and the request-and-response process between the event handler 212 and the state machine 206. Furthermore, resource-intensive DOMs do not have to be built, which would necessitate materialization of metadata for each of multiple steps, such as once for validation and once for transformation, as with other approaches. Consequently, in one embodiment, only one parse of the input stream is required, rather than multiple parses.

Figure 4:
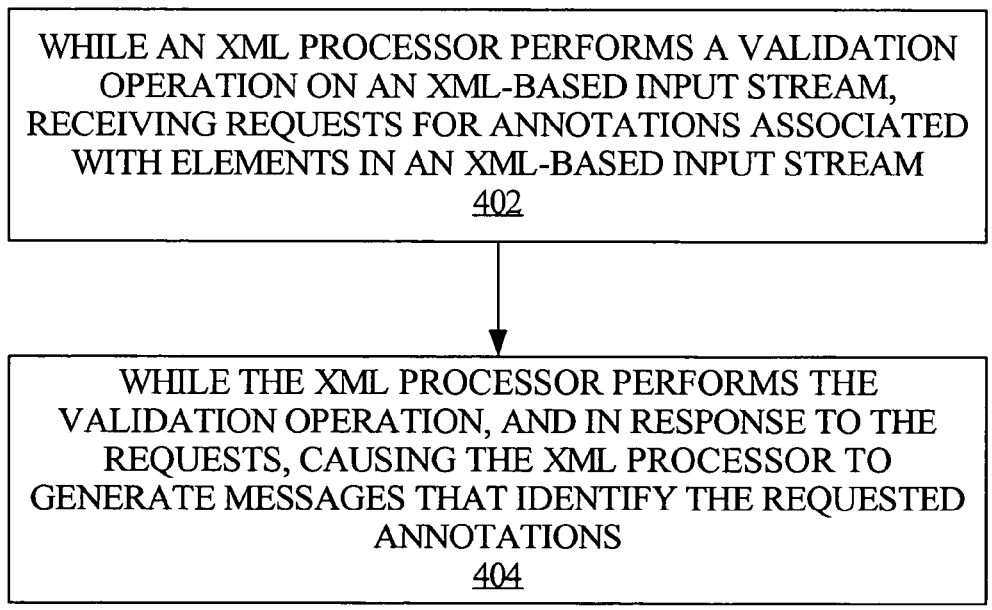
FIG. 4 is a flow diagram that illustrates a method for processing XML-based information.

FIG. 4 is a flow diagram that illustrates a method for processing XML-based information.

Blocks 402 and 404 are performed while an XML processor, such as XML processor 102, is performing a validation operation on an XML-based input stream, such as XML input stream 104 (FIG. 1). In one embodiment, at block 402, requests for annotations that are associated with elements in an XML-based input stream, are received. At block 404, according to an embodiment, the XML processor is caused to generate messages that identify the requested annotations in response to the request.

In contrast to approaches in which the entire XML input is validated before any additional processing of an element can occur, the techniques illustrated in FIG. 4 allow validation-time processing of XML nodes. Hence, the techniques provide for requesting directions regarding such processing and generating messages that identify the processing, for a particular node, while that particular node is being validated. Furthermore, the method of FIG. 4 can occur without having to wait for validation of the entire XML input prior to receiving requests and generating associated responses, without having to reparse the input stream, and without having to build a resource-intensive DOM.

In an embodiment, the request received at block 402 is received by state machine 206 of validator 202, from event handler 212 of user application 108, in response to reception at event handler 212 of an event in a SAX stream based on XML input stream 104. Furthermore, in an embodiment, the messages that identify the annotations are streamed in an output stream, for example, to the external application that requests the annotation. Hence, a validation operation performed by an XML processor and a data transformation process performed by an external application can occur essentially at the same time while maintaining the streaming manner of data transmission.

In an embodiment, at block 404 the XML processor 102 (FIG. 1) is caused to generate a message that identifies an annotation that is associated with a first element, only if the first element is determined valid based on the validation operation performed by the XML processor 102. Hence, unnecessary processing of and communicating about an "invalid" XML node, by the XML processor 102 and the user application 108 (FIG. 1), is avoided. Therefore, in comparison with other approaches, a more efficient processing model and technique is provided.

Implementation Mechanisms

The approach for streaming validation-based XML processing directions, as described herein, may be implemented in a variety of ways and the invention is not limited to any particular implementation. The approach may be integrated into a system or a device, or may be implemented as a stand-alone mechanism. Furthermore, the approach may be implemented in computer software, hardware, or a combination thereof.

Hardware Overview

Figure 5:
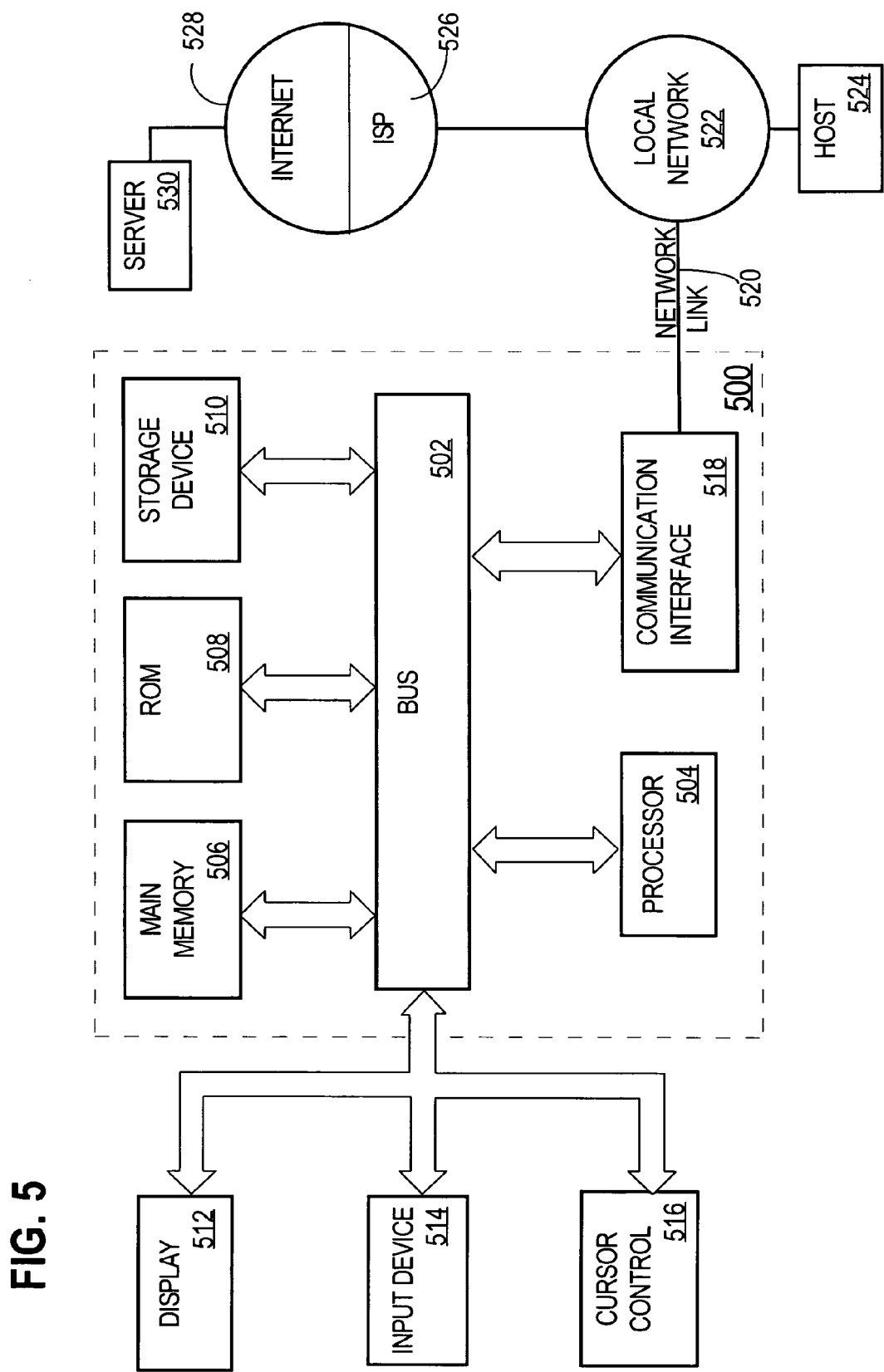
FIG. 5 is a block diagram that depicts a computer system 500 upon which an embodiment of the invention may be implemented.

FIG. 5 is a block diagram that depicts a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising the computer-implemented steps of:
after an XML processor, which is configured to send validated XML data to an application, starts performing a validation operation on an XML-based input stream, and before said XML processor completes performing said validation operation on said XML-based input stream, performing the steps of:
after starting to validate a particular XML element in said XML-based input stream, and before completion of validating said particular XML element in said XML-based input stream, performing the computer-implemented step of said XML processor receiving one or more requests for particular information relating to said validation operation, wherein said one or more requests include at least one of:
(a) a request for whether said particular XML element is defined in corresponding information that dictates the structure of said XML data in said XML-based input stream;
(b) a request for the name of said particular XML element;
(c) a request for the data type of said particular XML element;
(d) a request for whether said particular XML element conforms to the corresponding information that dictates the structure of said XML data in said XML-based input stream;
(e) a request for the current validation mode of said validation operation;
(f) a request for the current state of said validation operation; or
(g) a request for one or more annotations that are associated with said particular XML element;
said XML processor generating one or more messages that include said particular information; and
said XML processor responding to said one or more requests for said particular information by providing said one or more messages.

2. The method of claim 1, wherein the step of said XML processor generating said one or more messages is performed in response to receiving said one or more requests.

3. The method of claim 1, wherein the step of said XML processor receiving said one or more requests for said particular information includes receiving said one or more requests via an application program interface through which information about said validation operation can be requested by the application.

4. The method of claim 1, wherein the step of said XML processor generating said one or more messages includes generating said one or more messages that are transmitted in an output stream.

5. The method of claim 1, wherein the step of said XML processor generating said one or more messages includes causing said XML processor to generate said one or more messages before completion of said validation operation on said XML-based input stream.

6. The method of claim 1,
wherein said validation operation includes performing a validation operation on said particular XML element of said XML-based input stream; and
wherein the step of said XML processor generating said one or more messages includes causing said XML processor to generate said one or more messages that indicate how to process said particular XML element, only if said particular XML element is determined valid based on said validation operation on said particular XML element.

7. The method of claim 1, wherein said particular information, which is included in said one or more messages, comprises one or more of:
first data indicating whether said particular XML element is defined in the corresponding information that dictates the structure of said XML data in said XML-based input stream;
the name of the particular XML element that is currently being processed;
the data type of the particular XML element that is currently being processed;
second data indicating whether said particular XML element conforms to the corresponding information that dictates the structure of said XML data in said XML-based input stream;
the current validation mode for the particular XML element that is currently being processed, wherein the current validation mode is one of strict mode, lax mode, and skip mode;
the current state of said validation operation; or
the one or more annotations that are associated with the particular XML element that is currently being processed.

8. The method of claim 1, wherein the step of said XML processor receiving said one or more requests includes receiving a request regarding whether a first element of said XML-based input stream is defined in corresponding information that dictates the structure of XML data.

9. The method of claim 1, wherein the step of said XML processor receiving said one or more requests for said particular information includes receiving a request regarding what data type definition is associated with said particular XML element of said XML-based input stream, wherein said data type is defined in information that dictates the structure of corresponding XML data.

10. The method of claim 1, wherein the step of said XML processor receiving said one or more requests for said particular information includes receiving a request regarding what data type definition is associated with an attribute of said particular XML element, wherein said data type that is associated with said attribute is defined in said information that dictates the structure of corresponding XML data.

11. The method of claim 1, wherein the step of said XML processor receiving said one or more requests for said particular information includes receiving a request regarding whether a data type of content of said particular XML element of said XML-based input stream conforms to a corresponding data type definition in information that dictates the structure of corresponding XML data.

12. The method of claim 1, wherein the step of said XML processor receiving said one or more requests for said particular information includes receiving a request regarding a first annotation that is associated with said particular XML element of said XML-based input stream, wherein said first annotation is defined in information that dictates the structure of corresponding XML data.

13. The method of claim 12, wherein said information that dictates the structure of corresponding XML data comprises a second annotation definition that is associated with a second XML element of said XML-based input stream that is different than said particular XML element, and wherein the step of said XML processor receiving said one or more requests for said particular information includes receiving a request regarding said second annotation, the method further comprising the computer-implemented step of:
before responding to said request regarding said second annotation, responding to a request regarding whether said particular XML element is defined in said information that dictates the structure of corresponding XML data.

14. The method of claim 1, wherein the step of said XML processor receiving said one or more requests for said particular information includes receiving a request regarding a status of said validation operation with respect to said particular XML element of said XML-based input stream.

15. The method of claim 1, wherein the step of said XML processor receiving said one or more requests for said particular information includes receiving a request from an event handler sent in response to an event received in a parser output stream.

16. The method of claim 1, wherein the step of said XML processor responding to said one or more requests includes providing, in an output stream, said particular information.

17. The method of claim 1, further comprising the computer-implemented step of:
parsing said XML-based input stream only once for both of said validation operation and operations that are dictated by annotations associated with elements in said XML-based input stream.

18. The method of claim 1, wherein information that dictates the structure of said XML data in said XML-based input stream, with which said input stream is validated in said validation operation, comprises a plurality of schema definitions that are associated with a plurality of corresponding XML documents that could be constituent to said XML-based input stream.

19. The method of claim 1, further comprising the computer-implemented step of:
reading said one or more annotations from metadata that corresponds to said XML-based input stream.

20. The method of claim 1, further comprising the computer-implemented step of:
reading said one or more annotations from an XML schema that corresponds to said XML-based input stream.

21. The method of claim 1, wherein the step of said XML processor generating said one or more messages includes causing said XML processor to generate said one or more messages that indicate to the application how to conform said particular XML element to one or more requirements of the application that uses said particular XML element.

22. A computer-readable volatile or non-volatile medium storing instructions for:
a validator that validates elements and attributes in an XML-based input stream against information that dictates the structure of corresponding elements and attributes, said validator comprising:
a state machine that receives and responds to requests for particular information associated with a first element in said XML-based input stream, after starting to validate said first element and before completion of validating said first element;
wherein said requests for said particular information comprise one or more of:
(a) a request for whether said first element is defined in said information that dictates the structure of said corresponding elements and attributes;
(b) a request for the name of said first element;
(c) a request for the data type of said first element;
(d) a request for whether said first element conforms to said information that dictates the structure of said corresponding elements and attributes;
(e) a request for the current validation mode for said first element, wherein the current validation mode is one of strict mode, lax mode, and skip mode;
(f) a request for the current state of a validation operation currently being performed on said first element; or
(g) a request for one or more annotations that are associated with said first element.

23. The computer-readable volatile or non-volatile medium of claim 22, wherein said state machine is able to respond to a request for information about an annotation associated with said first element, while validating elements or attributes in said XML-based input stream.

24. The computer-readable volatile or non-volatile medium of claim 22, wherein said state machine is able to respond to a request that is responsive to an event in a parsed output stream that is based on said XML-based input stream.

25. A computer-readable volatile or non-volatile medium storing one or more sequences of instructions which, when executed by one or more processors, cause the one or more processors to perform the steps of:
after an XML processor, which is configured to send validated XML data to an application, starts performing a validation operation on an XML-based input stream, and before said XML processor completes performing said validation operation on said XML-based input stream, performing the steps of:

after starting to validate a particular XML element in said XML-based input stream, and before completion of validating said particular XML element in said XML-based input stream, performing the computer-implemented step of said XML processor receiving one or more requests for particular information relating to said validation operation, wherein said one or more requests include at least one of:
(a) a request for whether said particular XML element is defined in corresponding information that dictates the structure of said XML data in said XML-based input stream;
(b) a request for the name of said particular XML element;
(c) a request for the data type of said particular XML element;
(d) a request for whether said particular XML element conforms to the corresponding information that dictates the structure of said XML data in said XML-based input stream;
(e) a request for the current validation mode of said validation operation;
(f) a request for the current state of said validation operation; or
(g) a request for one or more annotations that are associated with said particular XML element;
said XML processor generating one or more messages that include said particular information; and
said XML processor responding to said one or more requests for said particular information by providing said one or more messages.

26. The computer-readable volatile or non-volatile medium of claim 25, wherein the instructions that cause said XML processor to generate said one or more messages are performed in response to receiving said one or more requests.

27. The computer-readable volatile or non-volatile medium of claim 25, wherein the instructions that cause the one or more processors to perform the step of said XML processors receiving said one or more requests for said particular information includes instructions which, when executed by the one or more processors, cause the one or more processors to perform the step of receiving said one or more requests via an application program interface through which information about said validation operation can be requested by the application.

28. The computer-readable volatile or non-volatile medium of claim 25, wherein the instructions that cause the one or more processors to perform the step of said XML processor generating said one or more messages includes instructions which, when executed by the one or more processors, cause said XML processor to generate said one or more messages that are transmitted in an output stream.

29. The computer-readable volatile or non-volatile medium of claim 25, wherein the instructions that cause the one or more processors to perform the step of said XML processor generating said one or more messages include instructions which, when executed by the one or more processors, cause said XML processor to generate said one or more messages before completion of said validation operation on said XML-based input stream.

30. The computer-readable volatile or non-volatile medium of claim 25,
wherein said validation operation includes performing a validation operation on said particular XML element of said XML-based input stream; and
wherein the instructions that cause the one or more processors to perform the step of said XML processor generating said one or more messages include instructions which, when executed by the one or more processors, cause said XML processor to generate said one or more messages that indicate how to process said particular XML element, only if said particular XML element is determined valid based on said validation operation on said particular XML element.

31. The computer-readable volatile or non-volatile medium of claim 25, wherein said particular information, which is included in said one or more messages, comprises one or more of:
first data indicating whether said particular XML element is defined in the corresponding information that dictates the structure of said XML data in said XML-based input stream;
the name of the particular XML element that is currently being processed;
the data type of the particular XML element that is currently being processed;
second data indicating whether said particular XML element conforms to the corresponding information that dictates the structure of said XML data in said XML-based input stream;
the current validation mode for the particular XML element that is currently being processed, wherein the current validation mode is one of strict mode, lax mode, and skip mode;
the current state of said validation operation; or
the one or more annotations that are associated with the particular XML element that is currently being processed.

32. The computer-readable volatile or non-volatile medium of claim 25, wherein the instructions that cause the one or more processors to perform the step of said XML processor receiving said one or more requests include instructions which, when executed by one or more processors, cause the one or more processors to perform the step of receiving a request regarding whether a first element of said XML-based input stream is defined in corresponding information that dictates the structure of XML data.

33. The computer-readable volatile or non-volatile medium of claim 25, wherein the instructions that cause the one or more processors to perform the step of said XML processor receiving said one or more requests for said particular information include instructions which, when executed by one or more processors, cause the one or more processors to perform the step of receiving a request regarding what data type definition is associated with said particular XML element of said XML-based input stream, wherein said data type is defined in information that dictates the structure of corresponding XML data.

34. The computer-readable volatile or non-volatile medium of claim 25, wherein the instructions that cause the one or more processors to perform the step of said XML processor receiving said one or more requests for said particular information include instructions which, when executed by the one or more processors, cause the one or more processors to perform the step of receiving a request regarding what data type definition is associated with an attribute of said particular XML element, wherein said data type that is associated with said attribute is defined in said information that dictates the structure of corresponding XML data.

35. The computer-readable volatile or non-volatile medium of claim 25, wherein the instructions that cause the one or more processors to perform the step of said XML processor receiving said one or more requests for said particular information include instructions which, when executed by the one or more processors, cause the one or more processors to perform the step of receiving a request regarding whether a data type of content of said particular XML element of said XML-based input stream conforms to a corresponding data type definition in information that dictates the structure of corresponding XML data.

36. The computer-readable volatile or non-volatile medium of claim 25, wherein the instructions that cause the one or more processors to perform the step of said XML processor receiving said one or more requests for said particular information include instructions which, when executed by the one or more processors, cause the one or more processors to perform the step of receiving a request regarding a first annotation that is associated with said particular XML element of said XML-based input stream, wherein said first annotation is defined in information that dictates the structure of corresponding XML data.

37. The computer-readable volatile or non-volatile medium of claim 36, wherein said information that dictates the structure of corresponding XML data comprises a second annotation definition that is associated with a second XML element of said XML-based input stream that is different than said particular XML element, wherein the instructions that cause the one or more processors to perform the step of said XML processor receiving said one or more requests for said particular information include instructions which, when executed by the one or more processors, cause the one or more processors to perform the step of receiving a request regarding said second annotation, and wherein the one or more sequences of instructions further comprise instructions which, when executed by the one or more processors, cause the one or more processors to perform the step of:
    before responding to said request regarding said second annotation, responding to a request regarding whether said particular XML element is defined in said information that dictates the structure of corresponding XML data.

38. The computer-readable volatile or non-volatile medium of claim 25, wherein the instructions that cause the one or more processors to perform the step of said XML processor receiving said one or more requests for said particular information include instructions which, when executed by the one or more processors, cause the one or more processors to perform the step of receiving a request regarding a status of said validation operation with respect to said particular XML element of said XML-based input stream.

39. The computer-readable volatile or non-volatile medium of claim 25, wherein the instructions that cause the one or more processors to perform the step of said XML processor receiving said one or more requests for said particular information include instructions which, when executed by the one or more processors, cause the one or more processors to perform the step of receiving a request from an event handler sent in response to an event received in a parser output stream.

40. The computer-readable volatile or non-volatile medium of claim 25, wherein the instructions that cause the one or more processors to perform the step of said XML processor responding to said one or more requests include instructions which, when executed by the one or more processors, cause the one or more processors to perform the step of providing, in an output stream, said particular information.

41. The computer-readable volatile or non-volatile medium of claim 25, wherein the one or more sequences of instructions further comprise instructions which, when executed by the one or more processors, cause the one or more processors to perform the step of:
    parsing said XML-based input stream only once for both of said validation operation and operations that are dictated by annotations associated with elements in said XML-based input stream.

42. The computer-readable volatile or non-volatile medium of claim 25, wherein information that dictates the structure of said XML data in said XML-based input stream, with which said input stream is validated in said validation operation, comprises a plurality of schema definitions that are associated with a plurality of corresponding XML documents that could be constituent to said XML-based input stream.

43. The computer-readable volatile or non-volatile medium of claim 25, wherein the one or more sequences of instructions further comprise instructions which, when executed by the one or more processors, cause the one or more processors to perform the step of:
    reading said one or more annotations from metadata that corresponds to said XML-based input stream.

44. The computer-readable volatile or non-volatile medium of claim 25, wherein the one or more sequences of instructions further comprise instructions which, when executed by the one or more processors, cause the one or more processors to perform the step of:
    reading said one or more annotations from an XML schema that corresponds to said XML-based input stream.

45. The computer-readable volatile or non-volatile medium of claim 25, wherein the instructions that cause the one or more processors to perform the step of said XML processor generating said one or more messages include instructions which, when executed by the one or more processors, cause said XML processor to generate said one or more messages that indicate to the application how to conform said particular XML element to one or more requirements of the application that uses said particular XML element.

* * * * *

UNITED STATES PATENT AND TRADEMARK OFFICE
CERTIFICATE OF CORRECTION

PATENT NO.       : 7,587,667 B2                                                    Page 1 of 1
APPLICATION NO.  : 10/798474
DATED            : September 8, 2009
INVENTOR(S)      : Scardina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Twenty-first Day of September, 2010

David J. Kappos
*Director of the United States Patent and Trademark Office*